(12) United States Patent
Park et al.

(10) Patent No.: US 6,607,460 B2
(45) Date of Patent: Aug. 19, 2003

(54) HYDRAULIC CONTROL SYSTEM FOR AUTOMATIC TRANSMISSION

(75) Inventors: Jong-Sool Park, Suwon (KR); Chang-Wook Lee, Yongin (KR); Joon-Bae Kim, Seongnam (KR); Jae-Duk Jang, Yongin (KR); Tae-Kyun Kim, Yongin (KR); Jin-Hee Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/028,115

(22) Filed: Dec. 20, 2001

(65) Prior Publication Data

US 2002/0086756 A1 Jul. 4, 2002

(30) Foreign Application Priority Data

Dec. 30, 2000 (KR) .......................................... 2000-87011

(51) Int. Cl.[7] ............................................... F16H 31/00
(52) U.S. Cl. .................................................... 475/123
(58) Field of Search ........................... 475/123; 477/131

(56) References Cited

U.S. PATENT DOCUMENTS

| | | | | | |
|---|---|---|---|---|---|
| 5,382,201 | A | * | 1/1995 | Iizuka | 475/123 |
| 5,813,941 | A | * | 9/1998 | Jang | 475/123 |
| 6,074,319 | A | * | 6/2000 | Sato et al. | 475/123 |

\* cited by examiner

*Primary Examiner*—Dirk Wright
(74) *Attorney, Agent, or Firm*—Pennie & Edmonds LLP (57) ABSTRACT

This invention provides a hydraulic control system for controlling a power train including four clutches and two brakes, wherein a first pressure controlled by a first solenoid valve is selectively supplied to two clutches of the power train under control of a first switch valve, a second pressure controlled by a second control valve is selectively supplied to another clutch and a first brake of the power train under control of a second switch valve, hydraulic pressure from a port of a manual valve is supplied to yet another clutch via a control valve, hydraulic pressure from another port of the manual valve is supplied to a second brake via another control valve, and the two control valves are controlled by a third solenoid valve.

15 Claims, 6 Drawing Sheets

FIG.2

| shift range | | C1 | C2 | C3 | C4 | B1 | B2 | F1 | F2 | Engine brake |
|---|---|---|---|---|---|---|---|---|---|---|
| P | | | | | ◎ | ◯ | | | | |
| R | | | | ● | ◎ | ● | | | | Engage |
| N | | | | | ◎ | ◯ | | | | |
| D | 1 | ● | | | ◎ | | | ▲ | ▲ | |
| | 2 | ● | ● | | ◎ | | | ▲ | ▲ | |
| | 3 | ● | ● | | ◎ | | ● | | ▲ | |
| | 4 | ◯ | | | | | | | | Engage |
| 3 (O.D. OFF) | 1 | ● | | | ◎ | | | ▲ | ▲ | |
| | 2 | ● | ● | | ◎ | | ● | ▲ | ▲ | |
| | 3 | ● | ● | | ● | | | | △ | Engage |
| 2 | 1 | ● | | | ◎ | | ● | ▲ | ▲ | |
| | 2 | ● | | | ● | | | | △ | Engage |
| L | 1 | ● | | | ● | ● | | △ | △ | Engage |

● : Engage  
◯ : Operate as reaction element  
△ : Engagement and disengagement both permitted  
▲ : Operation of one-way clutch discontinued by C4 or B1

| Solenoid Valve Operational Chart | | | | | |
|---|---|---|---|---|---|
| Shift ranges and speeds | | S1 | S2 | S3 | S4 |
| P | P | OFF | OFF | OFF | OFF |
| R | R | OFF | OFF | OFF | OFF |
| N | N | OFF | OFF | OFF | OFF |
| D | 1 | OFF | ON | ON | OFF |
| | 2 | Selective control | ON | OFF | ON |
| | 3 | Selective control | OFF | ON | ON |
| | 4 | ON | OFF | OFF | ON |
| 3 (O.D. OFF) | 1 | OFF | ON | ON | OFF |
| | 2 | Selective control | ON | OFF | ON |
| | 3 | OFF | OFF | ON | ON |
| 2 | 1 | OFF | ON | ON | OFF |
| | 2 | OFF | ON | OFF | ON |
| L | 1 | OFF | ON | ON | OFF |

FIG.6

HYDRAULIC CONTROL SYSTEM FOR AUTOMATIC TRANSMISSION

BACKGROUND OF THE INVENTION

The present invention relates to a hydraulic control system for an automatic transmission, and more particularly, to a hydraulic control system for an automatic transmission that enables the advantages of one-way clutches to be optimally used during 1⇌2, 3⇌4, and 4⇌2 shifting.

Conventional automatic transmissions used in vehicles typically include a torque converter, a power train realized through a multi-stage gearshift mechanism that is connected to the torque converter, and a hydraulic control system that selectively operates one of a plurality of operational elements of the power train according to a driving state of the vehicle.

In designing such an automatic transmission, a design concept and plan are formulated based on a variety of factors such as performance, durability, reliability, mass-producibility, and manufacturing costs. After selecting a design concept, development is pursued in three broad areas that include mechanical operation, hydraulic control, and electronic control.

The power train, which falls under the mechanical operation category, is realized through a compound planetary gear set. The compound planetary gear set includes at least two simple planetary gear sets and performs control into a required shift stage. Hydraulic control, which is performed by a hydraulic control system, is used to control the power train. The hydraulic control system includes a pressure regulator for regulating hydraulic pressure generated by operation of an oil pump, a manual/automatic shift controller for forming a shift mode, a hydraulic pressure controller for controlling shift feel and responsiveness to enable smooth shifting, a damper clutch controller for operating a damper clutch of a torque converter, and a hydraulic pressure distributor for supplying suitable hydraulic pressures to friction elements.

The distribution of hydraulic pressure by the hydraulic pressure distributor is varied by solenoid valves that are On/Off controlled and by solenoid valves that are duty controlled, both types of control being performed by a transmission control unit. Accordingly, selective operation of the friction elements is realized to effect shifting into shift ranges and speeds.

In such an automatic transmission, although all the advantages of an automatic transmission over a manual transmission are provided (e.g., ease of driving), the generation of significant shift shock nevertheless remains a problem. To minimize shift shock, it is necessary to smoothly control clutches and brakes of the power train. In this regard, more effective than the most precise electronic control is the mounting of a one-way clutch.

In the case where shifting is performed during an already ongoing shift process, good responsiveness can be expected with the use of a one-way clutch. Because of such advantages, much research is being performed to improve shift feel with the use of two one-way clutches.

Figure 1:
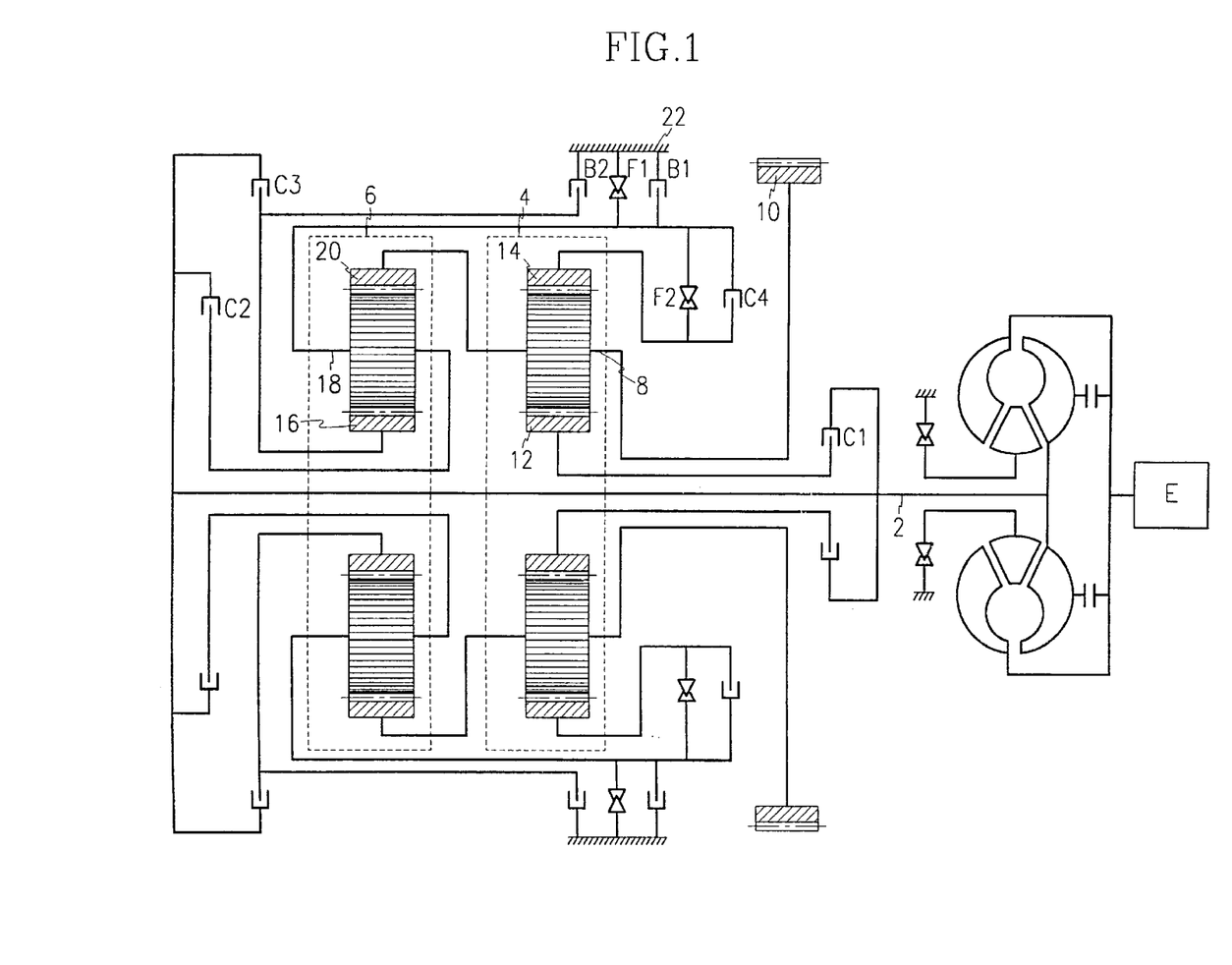
FIG. 1 is a schematic view of a conventional four-speed automatic transmission power train, in which one-way clutches are used.

FIG. 1 shows a schematic view of a conventional four-speed automatic transmission power train, in which one-way clutches are used.

Rotational force generated by an engine E is transmitted to an input shaft 2 through a torque converter. The input shaft 2 transmits the received torque to first and second single pinion planetary gear sets 4 and 6, and shifting is realized through the complementary operation of the first and second single pinion planetary gear sets 4 and 6. Clutch hook-up, through which output is effected, is realized via a transfer drive gear 10, which is connected to a planet carrier 8 of the first single pinion planetary gear set 4.

In the description below, a sun gear 12, the planet carrier 8, and a ring gear 14 of the first single pinion planetary gear set 4 will be preceded by the word "first" (e.g., the first sun gear 12); and a sun gear 16, a planet carrier 18, and a ring gear 20 of the second single pinion planetary gear set 6 will be preceded by the word "second".

In a state where the first planet carrier 8 is fixedly connected to the second ring gear 20, the first sun gear 12 is connected to the input shaft 2 via a first friction element C1. The first friction element C1 operates in all forward speeds. Further, the second planet carrier 18 is connected to the input shaft 2 via a second clutch C2, which operates in forward third and fourth speeds, and the second sun gear 16 is connected to the input shaft 2 via the third clutch C3, which operates in a reverse R range.

Also, the second planet carrier 18 is connected to a transmission housing 22 through a first brake B1 and a first one-way clutch F1, which are mounted in parallel, and is connected to a fourth clutch C4 through a second one-way clutch F2, the fourth clutch C4 being mounted in parallel to the first ring gear 14. Also, the second sun gear 16 is connected to the transmission housing 22 through the second brake B2.

Figure 2:
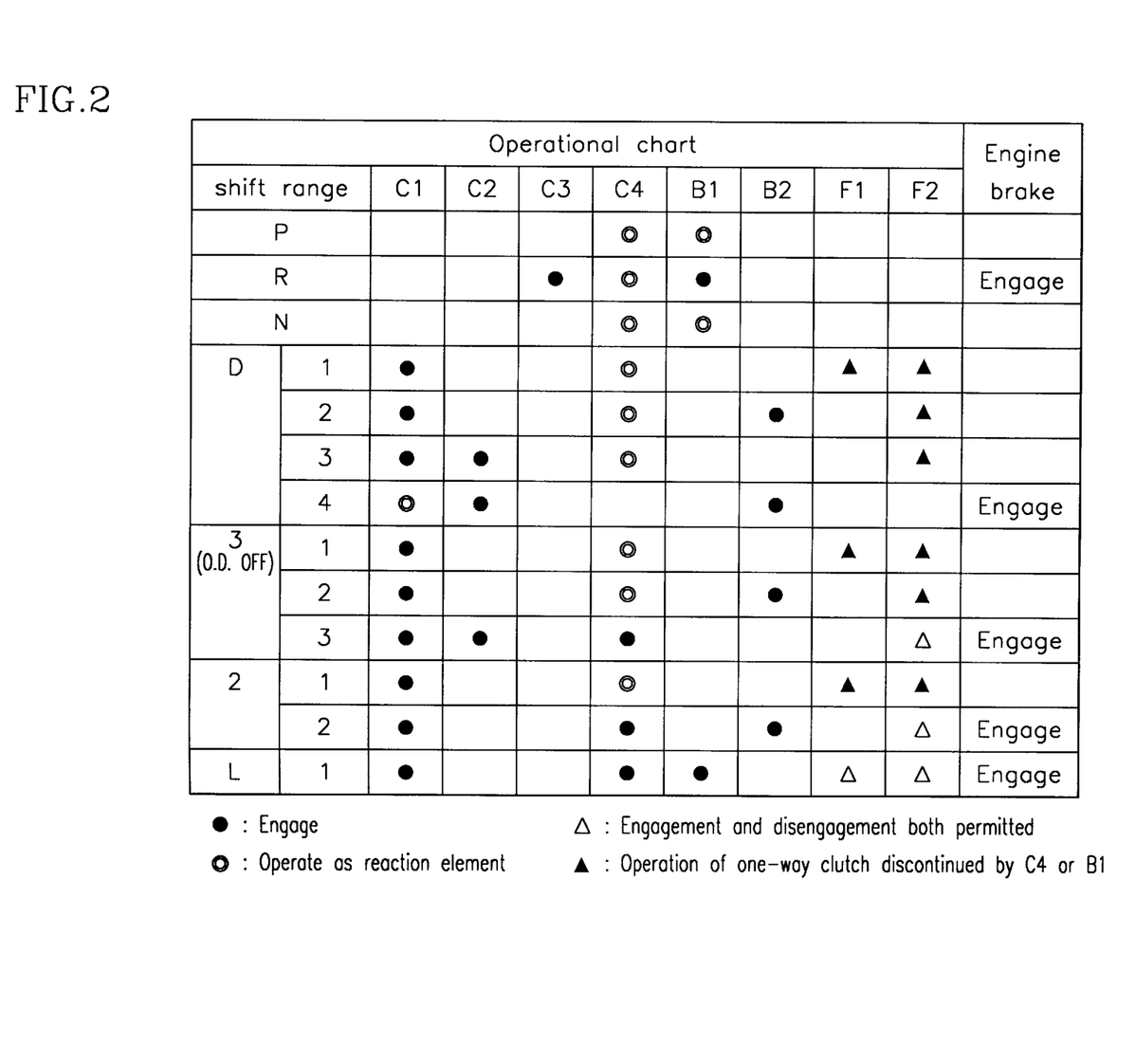
FIG. 2 is a chart showing operational states of friction elements of the power train of FIG. 1 according to shift speed and range.

In the power train described above, shifting is realized by operation of the friction elements, which are controlled by the transmission control unit. Referring to FIG. 2, the different operative states of the friction elements as well as an engine brake according to shift range and shift speeds within the ranges (where applicable) are shown. The shifting operation of the power train will be described with reference to FIG. 1 and the chart of FIG. 2.

In a first speed, the first clutch C1 and the first and second one-way clutches F1 and F2 are operated. Accordingly, the first sun gear 12 acts as an input element, and the first ring gear 14 and the second planet carrier 18 act as reaction elements. Shifting into a second speed from the first speed is realized by operation of the second brake B2. That is, through the engagement of the second brake B2, input is realized through the first sun gear 12, and the second sun gear 16 acts as a reaction element such that shifting into the second speed is realized.

Shifting into the third speed from the second speed is realized by operation of the second clutch C2 and disengagement of the second brake B2. As a result, the first and second single pinion planetary gear sets 4 and 6 are linked such that output that is identical to the input results. Shifting into the fourth speed (i.e., overdrive) from the third speed is realized by the operation of the second brake B2 such that the second sun gear 12 acts as a reaction element.

To effect shifting into the reverse R range, the third clutch C3 and the first brake B1 are controlled to engaged states such that input is realized through the second sun gear 16 and the second planet carrier 18 acts as a reaction element.

In sum and to describe operational states of the friction elements for ranges not yet mentioned, shifting is realized as follows: the first clutch C1 operates in the first, second and third speeds; the second clutch C2 operates in the third and fourth speeds; the third clutch C3 operates in the reverse R range; the fourth clutch C4 operates in the park P, reverse R, neutral N and low L ranges, and as needed in the first, second and third speeds; the first brake B1 operates in the park P, reverse R, neutral N and low L ranges; and the second brake B2 operates in the second and fourth speeds.

Figure 6:
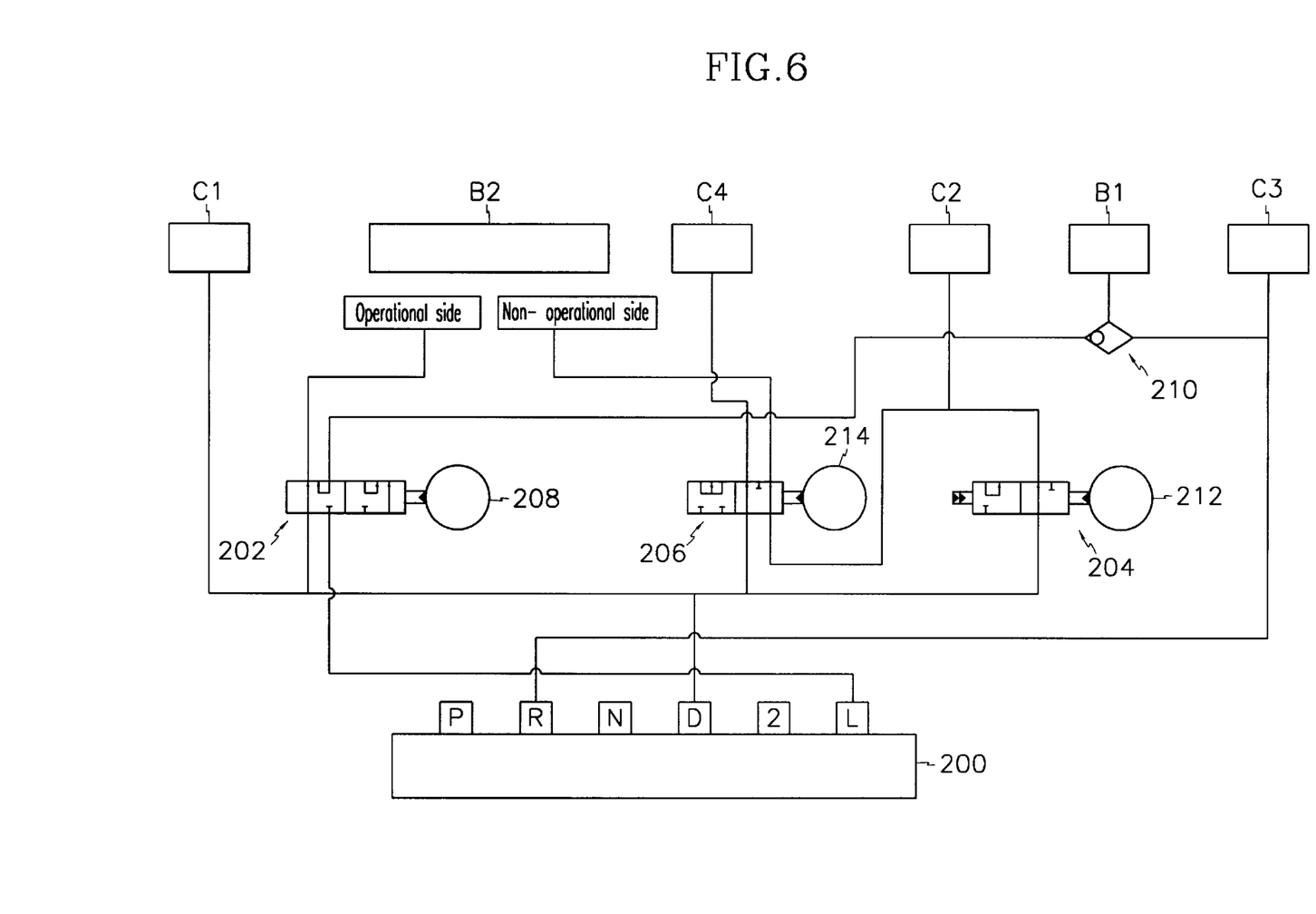
FIG. 6 is a schematic view of a conventional hydraulic control system.

With reference to FIG. 6, in a hydraulic control system for controlling the power train above, a D range pressure from a manual valve 200 is supplied to the first clutch C1 and to first, second, and third pressure control valves 202, 204, and 206. Also, an L range pressure is supplied to the first pressure control valve 202, and an R range pressure is supplied to the third clutch C3 and the first brake B1.

In addition, the D range pressure supplied to the first pressure control valve 202 is selectively supplied to an operational side of the second brake B2, according to control by the first solenoid valve 208, and the L range pressure is supplied to the first brake B1 in the low L range. The first brake B1 is connected to the first pressure control valve 202 and an R range port of the manual valve 200 via a shuttle valve 210 such that hydraulic pressure is supplied to the first brake B1 no matter which direction hydraulic pressure is supplied from. The D range pressure supplied to the second pressure control valve 204 is supplied to the second clutch C2 and the third pressure control valve 206 according to control by a second solenoid valve 212. Also, the D range pressure supplied to the third pressure control valve 206 is selectively supplied to the fourth clutch C4 according to control by a third solenoid valve 214. In such an instance where the D range pressure is supplied to the fourth clutch C4, the third pressure control valve 206 supplies hydraulic pressure from the second pressure control valve 204 to a non-operational side of the second brake B2.

However, in the conventional hydraulic control system as described above, since the system acts simply to control line pressure and the solenoid valves merely operate as switch valves to control timing, precise shift control is not possible. In particular, in the shift between the second and third speeds, since there is used a method of control in which the second brake B2 is disengaged when the second clutch C2 is engaged, precise control during shifting is not possible. Also, with the operation of the first brake B1 and the fourth clutch C4, which enable operation of the engine brake, since a method is used in which line pressure is directly supplied, significant shift shock is generated.

Further, during manual shifting from the low 2 range to the low L range, occurring simultaneously with the exhaust of operational side pressure of the second brake B2, is the supply of line pressure to the first brake B1 resulting in the generation of substantial shift shock. Shifting into the reverse R range from the drive D range when travelling at a high speed results in shifting being forcedly performed by line pressure, as well as possible damage to friction material.

In addition, if manual control into the low L range is performed when driving in the third or fourth speeds, engine rpm is excessively increased by the disengagement of the second clutch. Accordingly, the engine control unit abruptly performs engine fuel cut-off to protect the engine. However, shifting into neutral occurs during this control such that normal operation of the vehicle is not possible.

SUMMARY OF THE INVENTION

The present invention provides a hydraulic control system for an automatic transmission, in which two one-way clutches are used in a four-speed automatic transmission and the advantages of the one-way clutches are able to be optimally used during 1⇌2, 3⇌4, and 4⇌2 shifting.

An exemplary automatic transmission power train useful with the present invention includes first, second, third, and fourth clutches operating, respectively, when in first, second, and third speeds, when in third and fourth speeds, when in a reverse R range, and when an engine brake is required. The power train also includes a first brake, operating when the engine brake in the first speed is required or in the reverse R range, and a second brake operating in the second and fourth speeds.

Thus, according to a preferred embodiment of the invention, a hydraulic control system for a power train of an automatic transmission comprises at least first and second control valves communicating with a hydraulic pressure source, at least first and second solenoid valves communicating with the first and second control valves, respectively, to supply a control pressure thereto, at least first and second switch valves communicating with the first and second control valves, and a common third solenoid valve communicating with both the first and second switch valves to supply a control pressure thereto. In this embodiment, a first hydraulic pressure is selectively supplied to two clutches of the power train via the first control valve and under control of the first switch valve. A second hydraulic pressure is selectively supplied to another clutch and a first brake of the power train via the second control valve and under control of the second switch valve. Preferably, a manual valve is provided through which hydraulic pressure is supplied from the pressure source for selecting desired gear ranges.

In a further preferred embodiment, third and fourth control valves communicate with the hydraulic pressure source and a fourth solenoid valve communicates with both the third and fourth control valves to supply a control pressure thereto. The first hydraulic pressure is provided to another brake under control of the third control valve and third hydraulic pressure is provided to another clutch under control of the fourth control valve.

A hydraulic control system according to another preferred embodiment of the invention comprises a manual valve and a plurality of switch and control valves cooperating with solenoid valves. The manual valve includes an R range port for exhausting hydraulic pressure in the reverse R range, an N range port for exhausting hydraulic pressure in all shift ranges except the reverse R range, a D range port for exhausting hydraulic pressure in all forward driving ranges, and an L range port for exhausting hydraulic pressure in low range. A first switch valve selectively supplies a first pressure, which is controlled by a first solenoid valve, to the first clutch and the fourth clutch. A second switch valve selectively supplies a second pressure, which is controlled by a second solenoid valve, to the second clutch and the first brake. A third-clutch control valve controls hydraulic pressure received from the R range port of the manual valve and supplies the hydraulic pressure to the third clutch. A second-brake control valve controls hydraulic pressure supplied from the D range port of the manual valve and supplies the hydraulic pressure to the second brake. A third solenoid valve simultaneously controls the third-clutch control valve and the second-brake control valve.

According to a preferred embodiment of the present invention, the first switch valve supplies D range pressure to the first clutch when the first pressure is supplied to the fourth clutch, and supplies line pressure to the fourth clutch when the first pressure is supplied to the first clutch.

According to another preferred embodiment of the present invention, the first switch valve is controlled by a fourth solenoid pressure operating on one side and the D range pressure operating on an opposite side.

According to yet another preferred embodiment of the present invention, the first switch valve supplies the first pressure to the fourth clutch in the case where the D range pressure is greater than the fourth solenoid pressure.

According to still yet another preferred embodiment of the present invention, the second switch valve exhausts hydraulic pressure supplied to the second clutch when the second pressure is supplied to the first brake, and exhausts hydraulic pressure supplied to the first brake when the second pressure is supplied to the second clutch.

According to still yet another preferred embodiment of the present invention, the second switch valve is controlled by D range pressure operating on one side and by L range pressure and solenoid pressure operating on an opposite side, and the conversion of port communication is able to be accomplished by operation of both the L range pressure and the solenoid pressure in the case where the D range pressure is operating on the second switch valve.

According to still yet another preferred embodiment of the present invention, the solenoid pressure is pressure of a fourth solenoid valve.

According to still yet another preferred embodiment of the present invention, the second switch valve supplies the second pressure to the second clutch when the D range pressure is greater than a sum of the L range pressure and the solenoid pressure.

According to still yet another preferred embodiment of the present invention, the hydraulic control system further comprises a fail-safe valve mounted on a line extending between the second brake and the second-brake control valve, the fail-safe valve for blocking off a line between the second brake and the second-brake control valve when hydraulic pressure is supplied to the first brake or when hydraulic pressure is supplied simultaneously to the second clutch and the fourth clutch.

According to still yet another preferred embodiment of the present invention, the fail-safe valve is controlled by D range pressure supplied to one side, and by first brake supply pressure, second clutch supply pressure, and fourth clutch supply pressure supplied to an opposite side, the fail-safe valve exhausting hydraulic pressure supplied to the second brake in the case where the first brake supply pressure or a sum of the second and fourth clutch supply pressures is greater than the D range pressure, and, if this condition is not satisfied, communicating the second-brake control valve with the line of the second brake.

According to still yet another preferred embodiment of the present invention, the second pressure is hydraulic pressure exhausted from a second pressure control valve, which receives hydraulic pressure from the N range port of the manual valve and is controlled by the second solenoid valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 3:
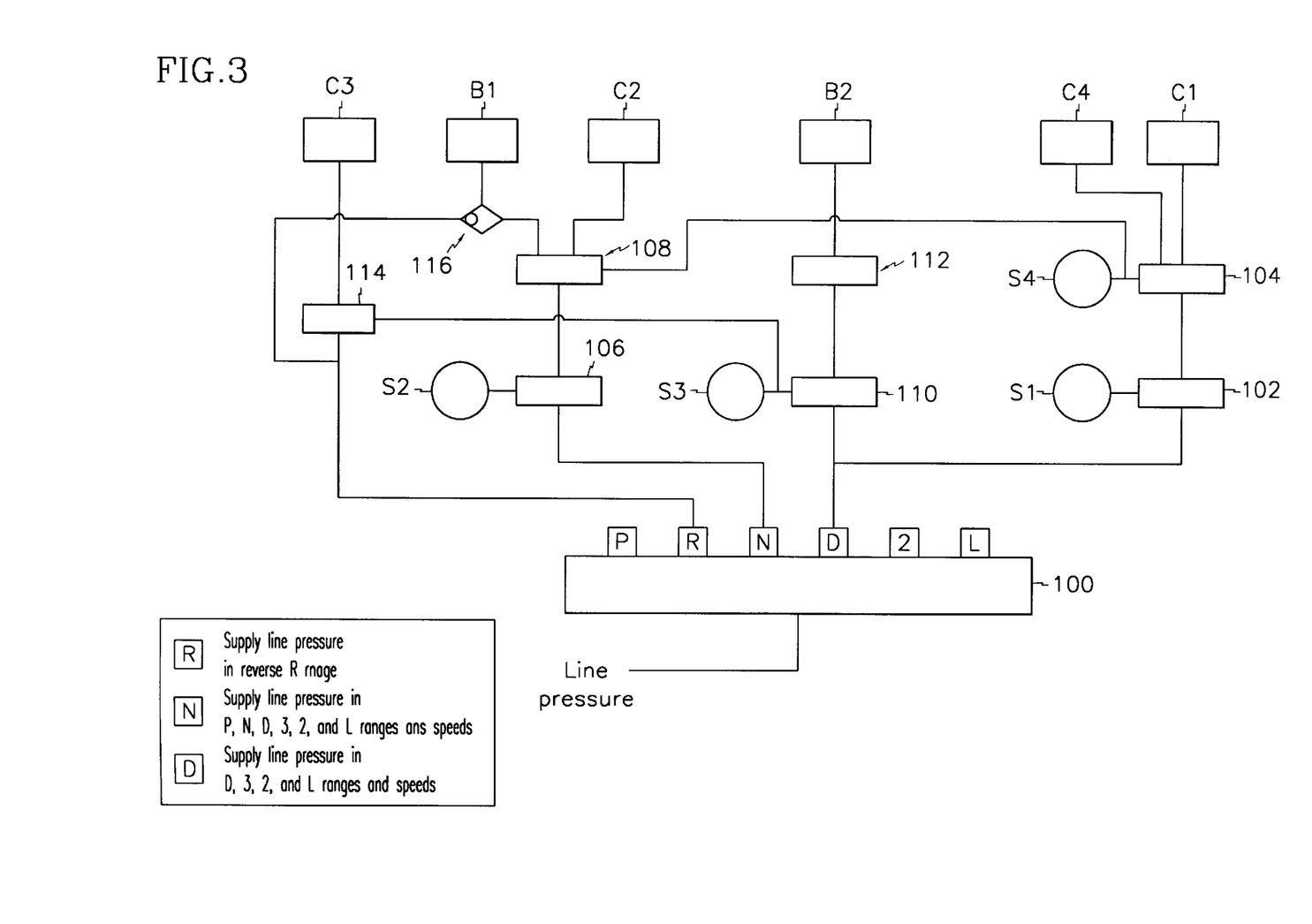
FIG. 3 is a schematic view of a hydraulic control system for an automatic transmission according to a preferred embodiment of the present invention.

Preferred embodiments of the present invention will now be described in detail with reference to the accompanying drawings. Since line pressure control and damper clutch control are performed as in the prior art, a detailed description of these operations will not be provided. In FIG. 3, elements from a manual valve 100, which is directly involved in the control of shifting into the different ranges, to friction elements are shown in block form.

Friction elements C1, C2, C3, C4, B1, and B2 are engaged for different speeds and ranges as in the conventional hydraulic control system. That is, with reference to FIG. 2, the first clutch C1 operates in first, second, and third speeds; the second clutch C2 operates in the third speed, as well as a fourth speed; the third clutch C3 operates in a reverse R range; the fourth clutch C4 operates in a park P range, the reverse R range, a neutral N range, and a low L range, and as needed in the first, second, and third speeds; the first brake B1 operates in the park P, reverse R, neutral N and low L ranges; and the second brake B2 operates in the second and fourth speeds.

However, in the present invention, the first clutch C1 and the fourth clutch C4 jointly use a hydraulic pressure, and the second clutch C2 and the first brake B1 jointly use a hydraulic pressure. The third clutch C3 and the second brake B2, on the other hand, are supplied with different control pressures. More specifically, the first and fourth clutches C1 and C4 jointly use an output pressure of a first pressure control valve 102, with the output pressure of the first pressure control valve 102 being selectively supplied to the first and fourth clutches C1 and C4 by operation of a first switch valve 104. Such joint utilization of pressure is possible since control of the first clutch C1 need only be performed during N→D shifting, while the fourth clutch C4 requires operation only in a second speed and higher.

Also, the second clutch C2 and the first brake B1 jointly use an output pressure of a second pressure control valve 106 by operation of a second solenoid valve S2. That is, the output pressure of the second pressure control valve 106 is selectively supplied to the second clutch C2 and the first brake B1 by a second switch valve 108. Such joint utilization of pressure is possible since control of the second clutch C2 need only be performed in the third and fourth speeds. The first and second switch valves 104 and 108 are controlled by a fourth solenoid valve S4, and N-range pressure of the manual valve 100 is used as supply pressure to operate the first brake B1 before shifting into the park P and neutral N ranges.

The second brake B2 receives an output pressure of a third pressure control valve 110 by operation of a third solenoid valve S3. A fail-safe valve 112 is mounted between the second brake B2 and the third pressure control valve 110. Also, the third clutch C3 receives an output pressure of a fourth pressure control valve 114, with the fourth pressure control valve 114 also being controlled by the third solenoid valve S3. In the reverse R range, pressure supplied to the fourth pressure control valve 114 is supplied to the first brake B1 via a shuttle valve 116 provided between the first brake B1 and the second switch valve 108.

Figure 4:
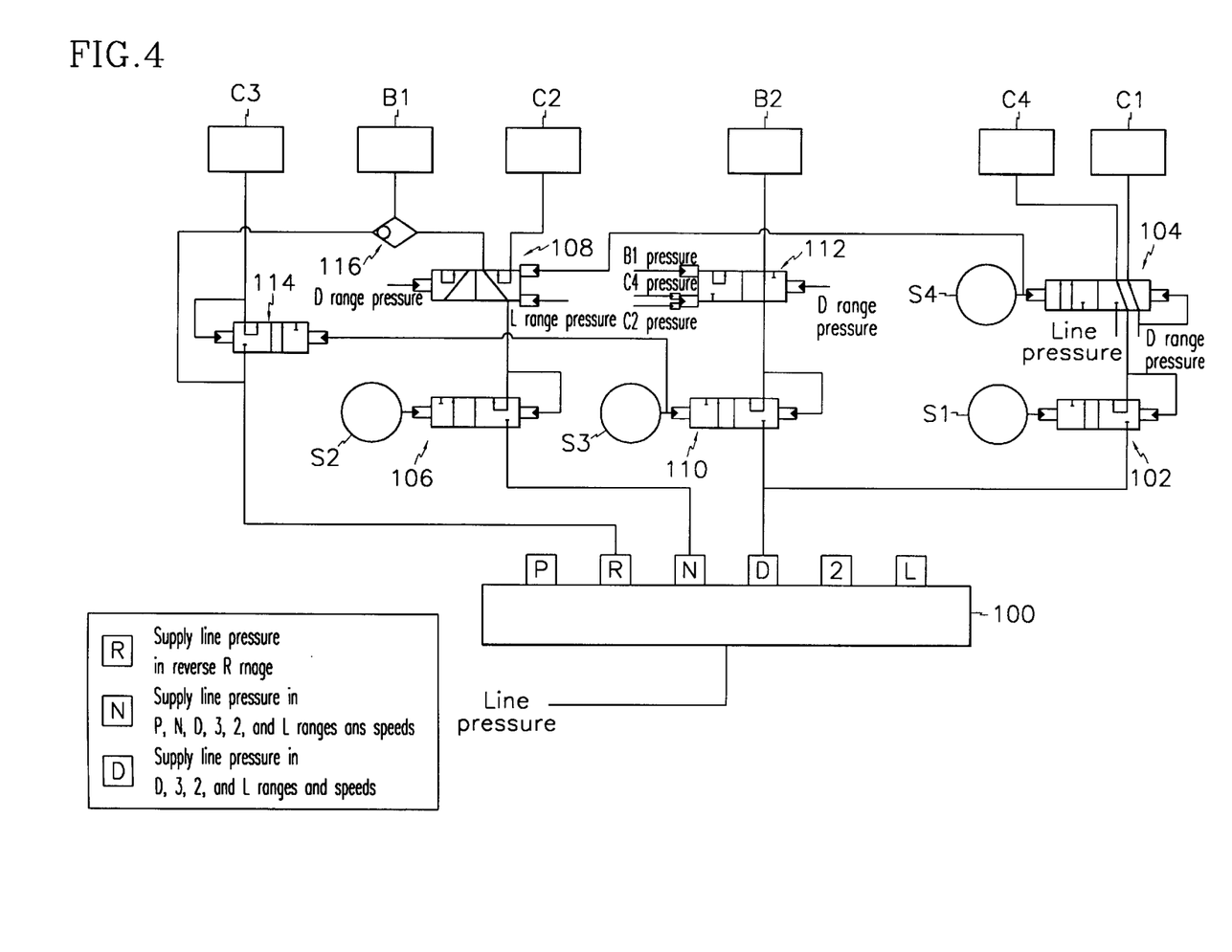
FIG. 4 is a detailed view of the hydraulic control system of FIG. 3.

FIG. 4 shows a detailed view of the hydraulic control system described above. The drawing will be used to describe the valves of the hydraulic control system in greater detail.

Lines are connected to the first pressure control valve 102 to enable the supply of D range pressure received from the manual valve 100 to the first switch valve 104, or to enable the exhaust of hydraulic pressure supplied to the first switch valve 104. For the conversion of port communication, the first pressure control valve 102 is controlled by control pressure of the first solenoid valve S1 and output pressure supplied to an opposite side of the first pressure control valve 102.

Lines are connected to the first switch valve 104 to supply line pressure and hydraulic pressure from the first pressure control valve 102 respectively to the fourth clutch C4 and the first clutch C1, or to supply hydraulic pressure supplied from the first pressure control valve 102 and D range pressure respectively to the fourth clutch C4 and the first clutch C1. For the conversion of port communication, the first switch valve 104 is structured for control by control pressure of the fourth solenoid valve S4 and D range pressure supplied to an opposite side of the first switch valve 104.

The first switch valve 104 is structured as in the above for specific reasons. Namely, the fourth clutch C4 must be maintained by line pressure in the park P, reverse R, and neutral N ranges since the fourth solenoid valve S4 is controlled to off in these ranges. Also, since the first clutch C1 need only be controlled during N→D shifting and for control into neutral when idling in the drive D range, control pressure of the first pressure control valve 102 requires supply in the P, R, and N ranges and in a first speed, while the fourth clutch C4 requires supply of line pressure.

Lines are connected to the second pressure control valve 106 to supply N range pressure from the manual valve 100 to the second switch valve 108 or to exhaust hydraulic pressure supplied to the second switch valve 108. For the conversion of port communication, the second pressure control valve 106 is controlled by pressure controlled by the second solenoid valve S2 and output pressure provided to an opposite side of the second pressure control valve 106.

Lines are connected to the second switch valve 108 to enable the supply of hydraulic pressure supplied from the second pressure control valve 106 to the second clutch C2 and the exhaust of hydraulic pressure supplied to the first brake B1, or to enable the supply of hydraulic pressure supplied from the second pressure control valve 106 to the first brake B1 and the exhaust of hydraulic pressure supplied to the second clutch C2. For the conversion of port communication, the second switch valve 108 is controlled by D range pressure, and by control pressure of the fourth solenoid valve S4 as well as L range pressure provided to an opposite side of the second switch valve 108.

Since operation of the second clutch C2 is only needed during typical driving of the vehicle and the first brake is operated only in the reverse R range or first speed of the low L range, L range pressure is used as control pressure. However, if at the instant when the manual valve 100 is controlled to the low L range the supply of hydraulic pressure to the second clutch C2 is discontinued while that to the first brake B1 is started, shift shock or a momentary inability to transmit power may result.

That is, shift shock results from the sudden supply of hydraulic pressure to the first brake B1, and in the case where shifting into the low L range is performed when driving at high speeds (e.g., in third or fourth speeds of the drive D range), the sudden disengagement of the second clutch C2 and engagement of the first brake B1 results in the equally sudden increase in engine rpm. If engine rpm increases to a level at or higher than a fuel cutout rpm, normal operation of the vehicle is not possible.

To solve this problem, therefore, both L range pressure and pressure of the fourth solenoid valve S4 operate as control pressure on a side of the second switch valve 108 opposite to that on which D range pressure operates. That is, the conversion of port communication can be accomplished by the operation of both the L range pressure and the pressure of the fourth solenoid valve S4.

Lines are connected to the third pressure control valve 110 to supply D range pressure supplied from the manual valve 100 to the fail-safe valve 112, or to exhaust hydraulic pressure supplied to the fail-safe valve 112. For the conversion of port communication, the third pressure control valve 110 is controlled by pressure controlled by the third solenoid valve S3 and output pressure supplied to an opposite side of the third pressure control valve 110.

Lines are connected to the fail-safe valve 112 such that hydraulic pressure supplied from the third pressure control valve 110 is supplied to the second brake B2, or hydraulic pressure supplied to the second brake B2 is exhausted. For the conversion of port communication, the fail-safe valve 112 is controlled by pressure controlled by control pressure of the first brake B1, the second clutch C2, and the fourth clutch C4, and by D range pressure supplied to an opposite side of the fail-safe valve 112. As a result, the fail-safe valve 112 acts to prevent the simultaneous engagement of the first and second brakes B1 and B2, and to disengage the second brake B2 when the second and fourth clutches C2 and C4 are both engaged.

Lines are connected to the fourth pressure control valve 114 to supply R range pressure supplied from the manual valve 100 to the third clutch C3, or to exhaust hydraulic pressure supplied to the third clutch C3. For the conversion of port communication, the fourth pressure control valve 114 is controlled by pressure controlled by the third solenoid valve S3 and by output pressure supplied to an opposite side of the fourth pressure control valve 114. Therefore, precise control is realized by the control of the fourth pressure control valve 114 by the third solenoid valve S3 during N→R shifting.

Figure 5:
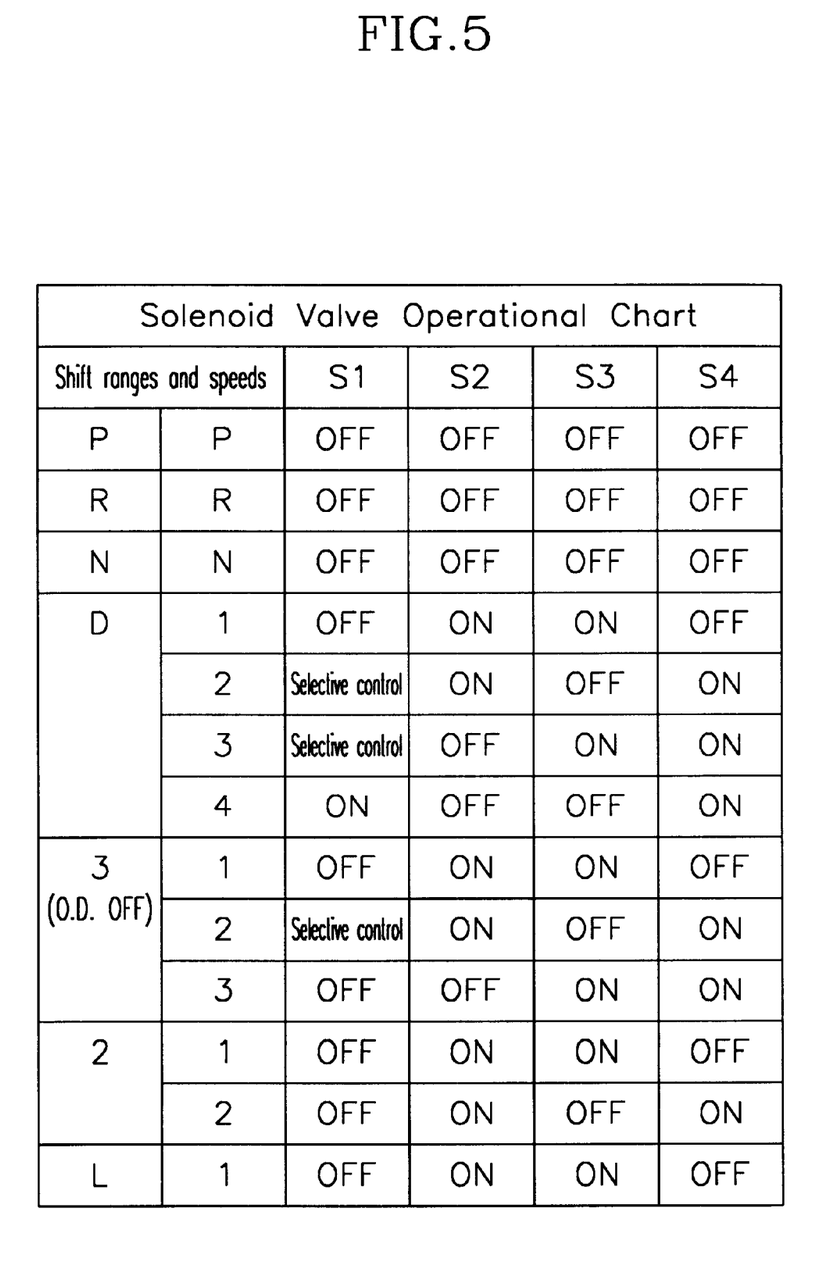
FIG. 5 is a chart showing operational states of solenoid valves applied to the hydraulic control system of FIG. 3.

The first, second, third and fourth solenoid valves S1, S2, S3, and S4 receive control pressure of a reducing valve (not shown) to control the pressure control valves. The solenoid valves S1, S2, S3, and S4 are operated as shown in FIG. 5 by a transmission control unit. The first, second, and third solenoid valves S1, S2, and S3 are duty controlled solenoid valves, preferably PWM (Pulse Width Modulation) types. Accordingly, "ON" in FIG. 5 refers also to the case where the first, second and third solenoid valves S1, S2 and S3 are duty controlled.

The friction elements of the inventive hydraulic control system are operated as shown in FIG. 2 according to the operation of the solenoid valves as shown in FIG. 5 to thereby realize shifting. A summary of the operation of the friction elements is as follows.

The first clutch C1, by the operation of the first switch valve 104, receives output pressure of the first pressure control valve 102 in the first speed, and D range pressure in the second, third, and fourth speeds.

The second clutch C2 receives hydraulic pressure through the second pressure control valve 106 and the second switch valve 108 in the third and fourth speeds, and the third clutch C3 receives control pressure of the fourth pressure control valve 114 in the reverse R range. Also, the fourth clutch C4, according to control by the first switch valve 104, receives line pressure in the park P, reverse R, and neutral N ranges, and output pressure of the first pressure control valve 102 in the second, third, and fourth speeds.

The first brake B1 receives hydraulic pressure directly from the manual valve 100 in the reverse R range, and, in the low L range, receives hydraulic pressure through the second pressure control valve 106 and the second switch valve 108. The second brake B2 receives hydraulic pressure through the third pressure control valve 110 and the fail-safe valve 112 in the second and fourth speeds.

In the hydraulic control system of the present invention described above, exceptional non-synchronous control by the one-way clutches is realized, fast shift response times are obtained, and hydraulic pressure control of the first friction element by the solenoid valves is effected to enable control into neutral when idling such that fuel consumption is minimized.

Further, with the good independent control, a high quality of shifting is realized. Also, the number of solenoid valves is reduced by realizing control of the six friction elements by the four solenoid valves. Finally, since shifting into four speeds is realized by two one-way clutches, the advantages of one-way clutches are fully utilized during 1⇌2, 3⇌4, and 4⇌2 shifting.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission, the hydraulic control system controlling an automatic transmission power train that includes: first, second, third, and fourth clutches operating respectively when in first, second, and third speeds, when in third and fourth speeds, when in a reverse R range, and when an engine brake is required; a first brake operating when the engine brake in the first speed is required or in the reverse R range; and a second brake operating in the second and fourth speeds, the hydraulic control system comprising:
   a manual valve including an R range port for exhausting hydraulic pressure in the reverse R range, an N range port for exhausting hydraulic pressure in all shift ranges except the reverse R range, a D range port for exhausting hydraulic pressure in all forward driving ranges, and an L range port for exhausting hydraulic pressure in low range;
   a first switch valve for selectively supplying a first pressure, which is controlled by a first solenoid valve, to the first clutch and the fourth clutch;
   a second switch valve for selectively supplying a second pressure, which is controlled by a second solenoid valve, to the second clutch and the first brake;
   a third-clutch control valve for controlling hydraulic pressure received from the R range port of the manual valve and supplying the hydraulic pressure to the third clutch;
   a second-brake control valve for controlling hydraulic pressure supplied from the D range port of the manual valve and supplying the hydraulic pressure to the second brake; and
   a third solenoid valve for simultaneously controlling the third-clutch control valve and the second-brake control valve.

2. The hydraulic control system of claim 1 wherein the first switch valve supplies D range pressure to the first clutch when the first pressure is supplied to the fourth clutch, and supplies line pressure to the fourth clutch when the first pressure is supplied to the first clutch.

3. The hydraulic control system of claim 2 wherein the first switch valve is controlled by a fourth solenoid pressure operating on one side and the D range pressure operating on an opposite side.

4. The hydraulic control system of claim 3 wherein the first switch valve supplies the first pressure to the fourth clutch in the case where the D range pressure is greater than the fourth solenoid pressure.

5. The hydraulic control system of claim 1 wherein the second switch valve exhausts hydraulic pressure supplied to the second clutch when the second pressure is supplied to the first brake, and exhausts hydraulic pressure supplied to the first brake when the second pressure is supplied to the second clutch.

6. The hydraulic control system of claim 5 wherein the second switch valve is controlled by D range pressure operating on one side and by L range pressure and solenoid pressure operating on an opposite side, and the conversion of port communication is able to be accomplished by operation of both the L range pressure and the solenoid pressure in the case where the D range pressure is operating on the second switch valve.

7. The hydraulic control system of claim 6 wherein the solenoid pressure is pressure of a fourth solenoid valve.

8. The hydraulic control system of claim 6 wherein the second switch valve supplies the second pressure to the second clutch when the D range pressure is greater than a sum of the L range pressure and the solenoid pressure.

9. The hydraulic control system of claim 1 further comprising a fail-safe valve mounted on a line extending between the second brake and the second-brake control valve, the fail-safe valve for blocking off a line between the second brake and the second-brake control valve when hydraulic pressure is supplied to the first brake or when hydraulic pressure is supplied simultaneously to the second clutch and the fourth clutch.

10. The hydraulic control system of claim 9 wherein the fail-safe valve is controlled by D range pressure supplied to one side, and by first brake supply pressure, second clutch supply pressure, and fourth clutch supply pressure supplied to an opposite side, the fail-safe valve exhausting hydraulic pressure supplied to the second brake in the case where the first brake supply pressure or a sum of the second and fourth clutch supply pressures is greater than the D range pressure, and, if this condition is not satisfied, communicating the second-brake control valve with the line of the second brake.

11. The hydraulic control system of claim 1 wherein the second pressure is hydraulic pressure exhausted from a second pressure control valve, which receives hydraulic pressure from the N range port of the manual valve and is controlled by the second solenoid valve.

12. A hydraulic control system for a power train of an automatic transmission including plural clutches and brakes cooperating with a planetary gear system, wherein the hydraulic control system comprises:
   at least first and second control valves communicating with a hydraulic pressure source;
   at least first and second solenoid valves communicating with said first and second control valves, respectively, to supply a control pressure thereto;

at least first and second switch valves communicating with said first and second control valves; and a common, third solenoid valve communicating with both the first and second switch valves to supply a control pressure thereto;

wherein a first hydraulic pressure is selectively supplied to two clutches of the power train through said first control valve and under control of the first switch valve;

wherein a second pressure is selectively supplied to another clutch and a first brake of the power train through said second control valve and under control of the second switch valve.

13. The hydraulic control system of claim 12, further comprising a manual valve for selecting desired gear ranges through which hydraulic pressure is supplied form the pressure source.

14. The hydraulic control system of claim 12, further comprising:

third and fourth control valves communicating with the hydraulic pressure source; and a fourth solenoid valve communicating with both said third and fourth control valves to supply a control pressure thereto;

wherein the first hydraulic pressure is provided to another brake under control of the third control valve and third hydraulic pressure is provided to another clutch under control of the fourth control valve.

15. The hydraulic control system of claim 14, further comprising a fail safe valve disposed between the third control valve and said another brake, wherein hydraulic pressure is supplied to said another brake through said third control valve and under control of the fail safe valve.

* * * * *